United States Patent
Mori et al.

(10) Patent No.: US 11,790,660 B2
(45) Date of Patent: Oct. 17, 2023

(54) OBJECT RECOGNITION DEVICE AND OBJECT RECOGNITION METHOD

(71) Applicant: Mitsubishi Electric Corporation, Tokyo (JP)

(72) Inventors: Masanori Mori, Tokyo (JP); Noriyoshi Yamashina, Tokyo (JP); Koji Iida, Tokyo (JP); Shinichi Tateiwa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 459 days.

(21) Appl. No.: 17/050,890

(22) PCT Filed: Feb. 6, 2019

(86) PCT No.: PCT/JP2019/004204
§ 371 (c)(1),
(2) Date: Oct. 27, 2020

(87) PCT Pub. No.: WO2019/230055
PCT Pub. Date: Dec. 5, 2019

(65) Prior Publication Data
US 2021/0232829 A1    Jul. 29, 2021

(30) Foreign Application Priority Data

May 29, 2018    (JP) ................................ 2018-102605

(51) Int. Cl.
*G06K 9/00*    (2022.01)
*B60W 40/04*    (2006.01)
(Continued)

(52) U.S. Cl.
CPC ............ *G06V 20/56* (2022.01); *B60T 8/3275* (2013.01); *B60W 30/095* (2013.01); *B60W 40/04* (2013.01)

(58) Field of Classification Search
CPC .... G06V 20/56; B60T 8/3275; B60W 30/095; B60W 40/04; G01S 2013/9323;
(Continued)

(56) References Cited

U.S. PATENT DOCUMENTS

2017/0132934 A1*    5/2017    Kentley .................. G08G 1/202

FOREIGN PATENT DOCUMENTS

CN    108073893 A    *    5/2018    ........... G05D 1/0246
JP    6169146 B2    7/2017

OTHER PUBLICATIONS

International Search Report of PCT/JP2019/004204 dated Apr. 23, 2019 [PCT/ISA/210].
(Continued)

*Primary Examiner* — Peter D Nolan
*Assistant Examiner* — Demetra R Smith-Stewart
(74) *Attorney, Agent, or Firm* — Sughrue Mion, PLLC; Richard C. Turner

(57) ABSTRACT

An object recognition device is configured to: classify, under a state in which not all object data in a detection data group have been received and a part of the object data have been received by a current processing time, the part of the object data into pieces regarded as ready for association determination and pieces not regarded as ready for the association determination, to thereby associate the object data regarded as ready for the association determination and the prediction data individually with each other and set, as pending object data, the object data not regarded as ready for the association determination; and associate, under a state in which the remaining object data in the detection data group have been received by the next processing time after the current processing time, the remaining object data and the pending object data individually with the prediction data.

10 Claims, 6 Drawing Sheets

(51) Int. Cl.
*B60W 30/095* (2012.01)
*B60T 8/32* (2006.01)
*G06V 20/56* (2022.01)

(58) Field of Classification Search
CPC ........... G01S 2013/9324; G01S 13/862; G01S 13/865; G01S 13/867; G01S 13/931; G01S 15/86; G01S 15/931; G01S 17/931; G01S 13/87; G01S 13/726; G01S 15/66; G01S 17/66; G06T 2207/10016; G06T 2207/10048; G06T 2207/20076; G06T 2207/30252; G06T 7/277; G06T 7/246; G08G 1/166
See application file for complete search history.

(56) References Cited

OTHER PUBLICATIONS

Written Opinion of PCT/JP2019/004204 dated Apr. 23, 2019 [PCT/ISA/237].

\* cited by examiner

OBJECT RECOGNITION DEVICE AND OBJECT RECOGNITION METHOD

CROSS REFERENCE TO RELATED APPLICATIONS

This application is a National Stage of International Application No. PCT/JP2019/004204 filed on Feb. 6, 2019, claiming priority based on Japanese Patent Application No. 2018-102605 filed on May 29, 2018, the disclosure of which is incorporated herein in its entirely by reference.

TECHNICAL FIELD

The present invention relates to an object recognition device and an object recognition method, which are configured to process pieces of object data received from one or a plurality of sensors installed in an own vehicle.

BACKGROUND ART

An object recognition device of the related art (see Patent Literature 1, for example) is installed in an own vehicle, and is configured to recognize an object in the surroundings of its own vehicle by processing pieces of object data received from one or a plurality of sensors configured to detect information on a state of an object as object data. Specifically, the object recognition device described in Patent Literature 1 is configured to associate, at a current processing time, each of pieces of object data received in a period from a previous processing time to the current processing time with an associated time, and process such pieces of object data, to thereby estimate a state value of an object at the current processing time.

Automatic driving systems and other vehicle control systems are given as an application example of the object recognition device described above. A vehicle control system is configured to perform various forms of vehicle control, such as automatic braking and inter-vehicle distance control through use of the result of object recognition performed by the object recognition device.

CITATION LIST

Patent Literature

[PTL 1] JP 6169146 B2

SUMMARY OF INVENTION

Technical Problem

In Patent Literature 1, there is no particular mention about a relationship between a timing at which the object recognition device receives all pieces of object data included in a detection data group formed of a plurality of pieces of object data having the same associated time and a timing at which the object recognition device starts data processing. Therefore, there is room for further devising a configuration of the object recognition device in consideration of such a relationship.

The present invention has been made in view of the above-mentioned circumstances, and has an object to obtain an object recognition device and an object recognition method, which are configured to take into consideration a relationship between a timing at which all pieces of object data included in a detection data group formed of a plurality of pieces of object data having the same associated time are received and a timing at which data processing is started.

Solution to Problem

According to one embodiment of the present invention, there is provided an object recognition device, which is configured to receive, from a sensor, a detection data group formed of a plurality of pieces of object data having the same associated time, to thereby generate pieces of track data on respective objects individually corresponding to the plurality of pieces of object data included in the received detection data group, the object recognition device including: a data receiving unit configured to receive the detection data group from the sensor, and associate the associated time with the received detection data group; a prediction processing unit configured to generate, for each of the objects, prediction data being a predicted value of each of the pieces of track data for the associated time; an association processing unit configured to associate, for the respective objects, the pieces of object data for the associated time and the pieces of prediction data for the associated time individually with each other; and an update processing unit configured to generate, for each of the objects, the track data for the associated time through use of the object data and the prediction data that correspond to each other for the associated time, wherein the association processing unit is configured to: classify, under a state in which not all the pieces of object data in the detection data group have been received and a part of the pieces of object data have been received by a current processing time, the part of the pieces of object data into pieces regarded as ready for association determination and pieces not regarded as ready for the association determination, to thereby associate the pieces of object data regarded as ready for the association determination and the pieces of prediction data individually with each other and set, as pieces of pending object data, the pieces of object data not regarded as ready for the association determination; and associate, under a state in which remaining pieces of object data in the detection data group have been received by the next processing time after the current processing time, the remaining pieces of object data and the pieces of pending object data individually with the pieces of prediction data.

According to one embodiment of the present invention, there is provided an object recognition method for receiving a detection data group formed of a plurality of pieces of object data having the same associated time from a sensor, to thereby generate pieces of track data on respective objects individually corresponding to the plurality of pieces of object data included in the received detection data group, the object recognition method including the steps of: receiving the detection data group from the sensor, and associating the associated time with the received detection data group; generating, for each of the objects, prediction data being a predicted value of each of the pieces of track data for the associated time; associating, for the respective objects, the pieces of object data for the associated time and the pieces of prediction data for the associated time individually with each other; and generating, for each of the objects, the track data for the associated time through use of the object data and the prediction data that correspond to each other for the associated time, wherein the step of associating includes: classifying, under a state in which not all the pieces of object data in the detection data group have been received and a part of the pieces of object data have been received by a current processing time, the part of the pieces of object data into pieces regarded as ready for association determination and pieces not regarded as ready for the association determination, to thereby associate the pieces of object data regarded as ready for the association determination and the pieces of prediction data individually with each other and set, as pieces of pending object data, the pieces of object data not regarded as ready for the association determination; and associating, under a state in which remaining pieces of object data in the detection data group have been received by the next processing time after the current processing time, the remaining pieces of object data and the pieces of pending object data individually with the pieces of prediction data.

Advantageous Effects of Invention

According to the present invention, it is possible to obtain the object recognition device and the object recognition method, which are configured to take into consideration the relationship between the timing at which all pieces of object data included in the detection data group formed of the plurality of pieces of object data having the same associated time are received and the timing at which the data processing is started.

DESCRIPTION OF EMBODIMENTS

Now, an object recognition device and an object recognition method according to preferred embodiments of the present invention are described with reference to the accompanying drawings. In the illustration of the drawings, the same components or corresponding components are denoted by the same reference symbols, and the overlapping description thereof is herein omitted.

First Embodiment

Figure 1:
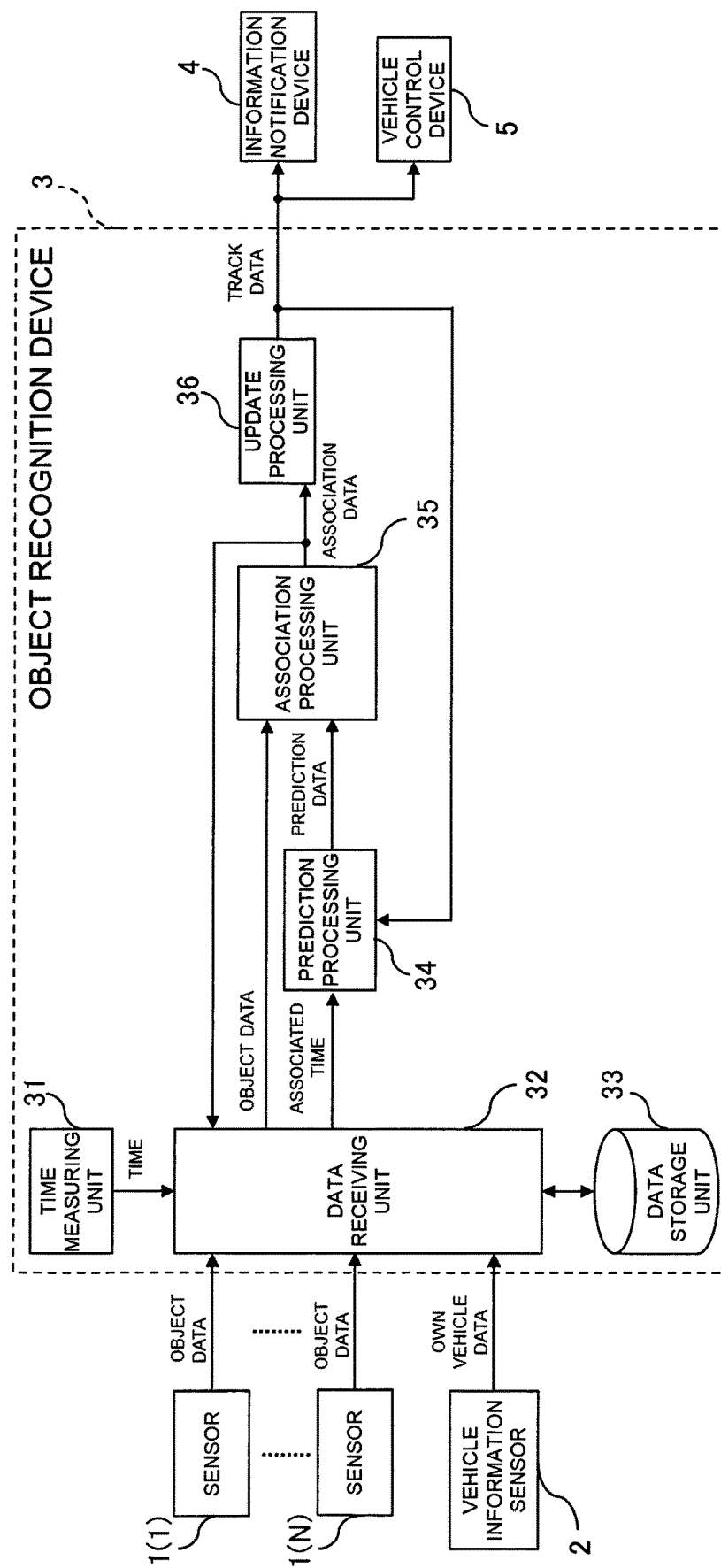
FIG. 1 is a block diagram for illustrating a configuration of a vehicle control system including an object recognition device according to a first embodiment of the present invention.

FIG. 1 is a block diagram for illustrating a configuration of a vehicle control system including an object recognition device 3 according to a first embodiment of the present invention.

In FIG. 1, the vehicle control system includes N sensors 1 (where N represents an integer equal to or larger than 2), a vehicle information sensor 2, the object recognition device 3, an information notification device 4, and a vehicle control device 5. In FIG. 1, "(1)", . . . , and "(N)" are added to reference numeral "1" of the N sensors 1 as suffixes, to thereby notate the N sensors 1 in a manner that discriminates one from another.

Each of the sensors 1 is installed in an own vehicle. The sensor 1 is configured to detect, as object data, information on an object present within a detectable range in the surroundings of the own vehicle to transmit the object data to the object recognition device 3. The object data includes information on an object, for example, a distance to the object, an azimuth of the object, or a relative speed of the object.

A sensor to be used as each of the sensors 1 is, for example, a sensor of a type that detects information on an object by receiving a detection wave, which is light, an electromagnetic wave, or the like that is emitted from the object, and performing signal processing, image processing, or other types of processing on the received detection wave. A sensor of a type that detects information on an object by applying a detection wave onto the object, receiving a portion of the detection wave that is reflected by the object, and performing processing on the received portion of the detection wave may also be used as the sensor 1. Specifically, the sensor 1 may be, for example, a millimeter-wave radar, a laser radar, an ultrasonic sensor, an infrared ray sensor, or an optical camera.

A position at which each of the sensors 1 is installed in the own vehicle and a detection range of each of the sensors 1 are assumed to be known. Further, the position at which each of the sensors 1 is installed in the own vehicle and other conditions can be set at discretion.

The number of pieces of object data detected by the sensor 1 is the same as the number of objects present within the detection range of the sensor 1. That is, with the sensor 1, when one object is present within the detection range, the number of pieces of object data detected by the sensor 1 is one. Meanwhile, with the sensor 1, when a plurality of objects are present within the detection range, the number of pieces of object data detected by the sensor 1 is the same as the number of the plurality of objects present within the detection range.

The vehicle information sensor 2 is configured to detect information on the own vehicle as own vehicle data to transmit the own vehicle data to the object recognition device 3. The own vehicle data includes a velocity, a wheel speed, a steering angle, a yaw rate, and other such information of the own vehicle, for example. The vehicle information sensor 2 may be configured to use the global positioning system (GPS) to detect the latitude, longitude, or traveling direction of the own vehicle as own vehicle data.

The object recognition device 3 is configured to receive, from the sensor 1, a detection data group formed of a plurality of pieces of object data having the same associated time, to thereby generate pieces of track data on the respective objects individually corresponding to the plurality of pieces of object data included in the received detection data group.

The object recognition device 3 includes a time measuring unit 31, a data receiving unit 32, a data storage unit 33, a prediction processing unit 34, an association processing unit 35, and an update processing unit 36. The object recognition device 3 is implemented by a microcomputer configured to execute arithmetic processing, a read only memory (ROM) configured to store program data, fixed-value data, and other such data, a random access memory (RAM) configured to have stored data updated and sequentially rewritten, a communication device configured to transmit and receive data, and a timer configured to measure time, for example.

The time measuring unit 31 is configured to measure a time in the object recognition device 3. The data receiving unit 32 is configured to receive the object data from each of the N sensors 1, and receive the own vehicle data from the vehicle information sensor 2. As the requirement arises, the data receiving unit 32 uses the own vehicle data to process the object data. The data receiving unit 32 is also configured to determine the associated time, which is a time at which object data was detected by the sensor 1 being a transmission source of the object data, and associate the determined associated time with the object data. A specific method of determining the associated time is disclosed in Patent Literature 1.

In this manner, the data receiving unit 32 receives the detection data group from the sensor 1, and associates the associated time with the object data included in the received detection data group. The data receiving unit 32 outputs the object data associated with the associated time to each of the association processing unit 35 and the prediction processing unit 34.

Figure 2:
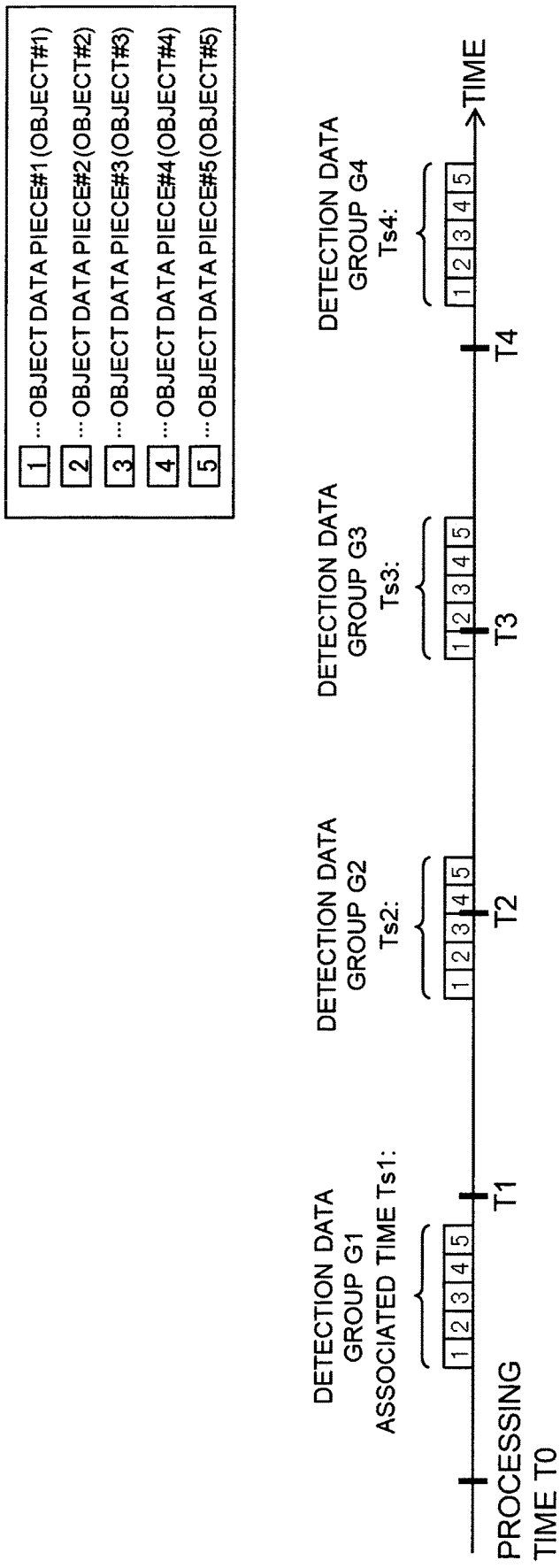
FIG. 2 is an explanatory diagram for illustrating a relationship between a timing at which the object recognition device according to the first embodiment of the present invention receives all pieces of object data included in a detection data group and a timing at which the object recognition device starts data processing.

Now, a relationship between a timing at which the object recognition device 3 receives all pieces of object data included in the detection data group formed of a plurality of pieces of object data having the same associated time and a timing at which the object recognition device 3 starts data processing is described with reference to FIG. 2. FIG. 2 is an explanatory diagram for illustrating the relationship between the timing at which the object recognition device 3 according to the first embodiment of the present invention receives all the pieces of object data included in the detection data group and the timing at which the object recognition device 3 starts the data processing.

In FIG. 2, as an example of a time (hereinafter referred to as "processing time") Tk at which the object recognition device 3 starts the data processing, processing times T0 to T4 are illustrated. In FIG. 2, there is also illustrated an exemplary case of repeatedly performing a series of processing steps in which one certain sensor 1 detects five object data pieces #1 to #5 individually corresponding to five objects #1 to #5 present within the detection range at the same time and transmits a detection data group formed of the detected object data pieces #1 to #5 to the data receiving unit 32.

In addition, in FIG. 2, detection data groups G1 to G4 are illustrated as an example of a plurality of detection data groups G having their corresponding associated times different from one another. The detection data group G1 is formed of the object data pieces #1 to #5 corresponding to an associated time Ts1. The detection data group G2 is formed of the object data pieces #1 to #5 corresponding to an associated time Ts2. The detection data group G3 is formed of the object data pieces #1 to #5 corresponding to an associated time Ts3. The detection data group G4 is formed of the object data pieces #1 to #5 corresponding to an associated time Ts4.

The sensor Si transmits the detection data group G formed of the object data pieces #1 to #5 detected at the same time to the object recognition device 3. In particular, when the sensor 1 is configured to transmit data to the object recognition device 3 through an in-vehicle network, for example, a control area network (CAN) or Ethernet (trademark), the sensor 1 compiles a CAN frame or an IP packet in units of objects, and transmits the object data for each object. Specifically, as illustrated in FIG. 2, when transmitting the detection data group G, the sensor 1 transmits the object data pieces #1 to #5 included in this group to the data receiving unit 32 one by one in order.

In this manner, when transmitting the detection data group G, the sensor 1 transmits the object data pieces #1 to #5 one by one in order, and then the data receiving unit 32 receives those object data pieces #1 to #5 one by one in order. The data receiving unit 32 associates the same associated time with those received object data pieces #1 to #5.

In the above-mentioned case, a case in which all the object data pieces #1 to #5 included in the detection data group G have been received before the processing time Tk is conceivable as a first case. In this case, the object data pieces #1 to #5 received before the processing time Tk in the detection data group G are associated with the associated time at the processing time Tk.

In the specific example of the first case, as illustrated in FIG. 2, all the object data pieces #1 to #5 included in the detection data group G1 have been received before the processing time T1. In this case, the object data pieces #1 to #5 are associated with the associated time Ts1 at the processing time T1.

A case in which not all the object data pieces #1 to #5 included in the detection data group G have been received before the processing time Tk is conceivable as a second case. In this case, the object data received before the processing time Tk in the detection data group G is associated with the associated time at the processing time Tk, and the remaining object data received after the processing time Tk in the detection data group G is associated with the associated time at a processing time after the processing time Tk.

In the specific example of the second case, as illustrated in FIG. 2, the object data pieces #1 to #3 included in the detection data group G2 are received before the processing time T2, and the remaining object data pieces #4 and #5 included in the detection data group G2 are received after the processing time T2. In this case, the object data pieces #1 to #3 are associated with the associated time Ts2 at the processing time T2, and the object data pieces #4 and #5 are associated with the associated time Ts2 at the processing time T3.

Now, as a comparative example, consideration is given to a case in which, when not all the pieces of object data in the detection data group transmitted from a certain sensor were received by the current processing time Tk under the situation illustrated in FIG. 2, the processing for the detection data group is kept in a standby state until all the pieces of object data have been received. In this case, the processing for the detection data group is started at a processing time after all the pieces of object data in the detection data group have been received.

Therefore, in such a comparative example, the standby state continues until all the pieces of object data in the detection data group have been received, and hence the processing for the detection data group is delayed, with the result that the responsiveness of the output of the object recognition device 3 is liable to deteriorate. When such deterioration in responsiveness of the output occurs, operation of emergency automatic braking or another such preventive safety system may be delayed.

In view of this, in the first embodiment, the object recognition device is configured to update, even when a part of the pieces of object data in the detection data group were received by the current processing time Tk, the track data without standing by until all the pieces of object data have been received. Therefore, it is possible to ensure the responsiveness of the output of the object recognition device 3.

Referring back to FIG. 1, the data storage unit 33 is configured to store the object data received by the data receiving unit 32 as the requirement arises.

The prediction processing unit 34 is configured to predict, with input of the track data output by the update processing unit 36, which is described later, and the associated time input from the data receiving unit 32, the track data at the associated time to generate a result of the prediction as prediction data. As a method of predicting the track data at the associated time, a known technology may be applied, and a detailed description of the method is omitted here.

The track data includes a state value of the object detected by the sensor 1. The state value of the object represents information including the position, speed, acceleration, and type of the object detected by the sensor 1.

The association processing unit 35 is configured to determine, with input of the object data that is output by the data receiving unit 32, and the prediction data that is output by the prediction processing unit 34, a correspondence between the object data and the prediction data. The association processing unit 35 outputs, to the update processing unit 36, association data, which is obtained by combining the object data and the prediction data with the determined correspondence.

The update processing unit 36 is configured to update the track data with input of the association data that is output by the association processing unit 35, through use of the object data and the prediction data that are included in the association data and correspond to each other. The update processing unit 36 outputs the track data to the prediction processing unit 34, the information notification device 4, and the vehicle control device 5.

The information notification device 4 is configured to provide, with input of the track data that is output by the update processing unit 36, a visual or auditory notification of information in accordance with the track data. For example, when expecting a collision between the own vehicle and a preceding vehicle based on the track data, the information notification device 4 controls an alarm unit to sound an alarm, or controls a display to display a message regarding the expected collision.

The vehicle control device 5 is configured to control, with input of the track data that is output by the update processing unit 36, operation of the vehicle in accordance with the track data. For example, when determining that the collision between the own vehicle and the preceding vehicle is unavoidable based on the track data, the vehicle control device 5 performs control to apply a brake.

Figure 3:
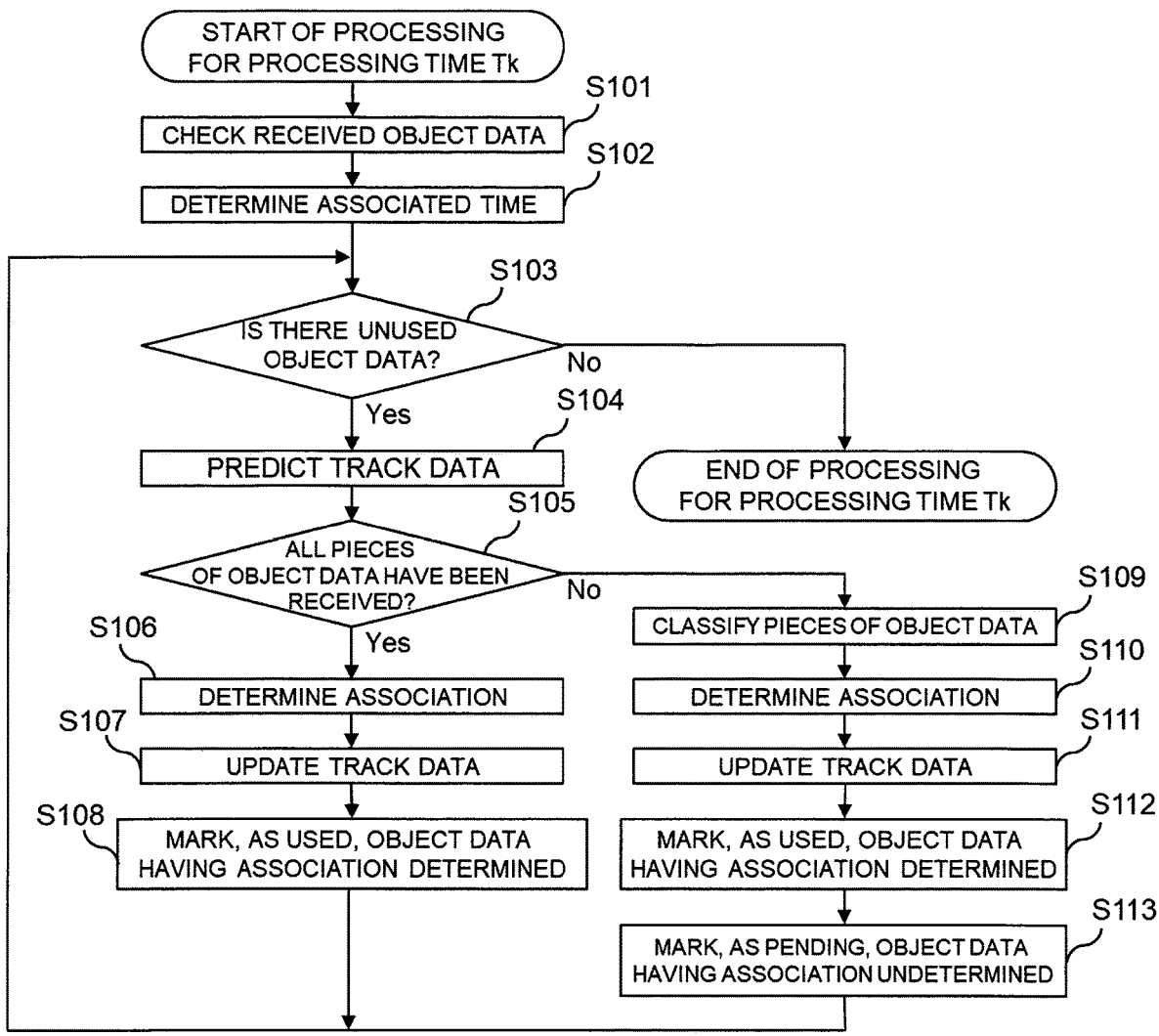
FIG. 3 is a flow chart for illustrating a series of operation steps of data processing to be performed by the object recognition device according to the first embodiment of the present invention.

Next, operation for data processing to be performed by the object recognition device 3 according to the first embodiment is described with reference to FIG. 3. FIG. 3 is a flow chart for illustrating a series of operation steps of the data processing to be performed by the object recognition device 3 according to the first embodiment of the present invention. The object recognition device 3 repeatedly performs the following operation in a certain operation cycle. In FIG. 3, the data processing is started at the processing time Tk described above.

In Step S101, the data receiving unit 32 checks, for each of the sensors 1, the object data received in a period from a previous processing time Tk−1 to the current processing time Tk. The processing then proceeds to Step S102.

In Step S102, the data receiving unit 32 performs the following processing for determining the associated time for each of the sensors 1, and then the processing proceeds to Step S103.

That is, the data receiving unit 32 determines the associated time to be associated with the first piece of object data received at the chronologically earliest point in the detection data group G. The data receiving unit 32 associates the determined associated time with the first piece of object data. The data receiving unit 32 associates the same associated time as that of the first piece of object data with the received pieces of object data remaining in the detection data group G.

The following series of processing steps of from Step S103 to Step S113 are performed for each of the sensors 1. Such processing is performed in order from, for example, the sensor 1 that has transmitted the piece of object data corresponding to the old associated time among the pieces of object data received in the period from the processing time Tk−1 to the processing time Tk.

In Step S103, the data receiving unit 32 determines whether there is object data that is not marked as "used", that is, whether there is unused object data. The unused object data is classified into object data marked as neither "used" nor "pending" (hereinafter referred to as "unmarked object data") and object data marked only as "pending" (hereinafter referred to as "pending object data").

As a result of the determination of Step S103, when it is determined that there is unused object data, the processing proceeds to Step S104, and when it is otherwise determined, the processing is ended. All the pieces of object data received in the period from the processing time Tk−1 to the processing time Tk are pieces of unmarked object data.

In Step S104, the prediction processing unit 34 performs the following prediction processing for each of the objects, and then the processing proceeds to Step S105.

That is, the prediction processing unit 34 uses the track data for a previous associated time before a current associated time corresponding to the unused object data to generate prediction data being a predicted value of the track data for the current associated time.

In this manner, the prediction processing unit 34 generates, for each of the objects, prediction data being the predicted value of the track data for the associated time.

In Step S105, the data receiving unit 32 determines whether all the pieces of object data in the detection data group G have been received. As a result of the determination, when it is determined that all the pieces of object data in the detection data group G have been received, the processing proceeds to Step S106, and when it is otherwise determined, the processing proceeds to Step S109.

Examples of a method of determining whether all the pieces of object data included in the detection data group have been received are given below.

As a first example, when it is premised that the number of pieces of object data included in the detection data group is fixed, the data receiving unit 32 performs the above-mentioned determination based on a result of whether a piece of object data transmitted last in the detection data group has been received. That is, when the piece of object data transmitted last in the detection data group has been received, the data receiving unit 32 determines that all the pieces of object data included in the detection data group have been received. Meanwhile, when the piece of object data transmitted last in the detection data group has not been received, the data receiving unit 32 determines that not all the pieces of object data included in the detection data group have been received.

As a second example, when it is premised that the number of pieces of object data included in the detection data group is variable, the sensor 1 first transmits data indicating a data count being the number of pieces of object data included in the detection data group before transmitting the detection data group. The data receiving unit 32 first receives the data indicating the data count, and performs the above-mentioned determination based on a result of whether pieces of object data corresponding to the data count have been received. That is, when the pieces of object data corresponding to the data count have been received, the data receiving unit 32 determines that all the pieces of object data included in the detection data group have been received. Meanwhile, when the pieces of object data corresponding to the data count have not been received, the data receiving unit 32 determines that not all the pieces of object data included in the detection data group have been received.

As a third example, the sensor 1 adds a flag to a piece of object data to be transmitted last in the detection data group. The data receiving unit 32 performs the above-mentioned determination based on a result of whether the piece of object data to which the flag has been added has been received. That is, when the piece of object data to which the flag has been added has been received, the data receiving unit 32 determines that all the pieces of object data included in the detection data group have been received. Meanwhile, when the piece of object data to which the flag has been added has not been received, the data receiving unit 32 determines that not all the pieces of object data included in the detection data group have been received.

In Step S106, the association processing unit 35 performs the following association determination for the respective objects, and then the processing proceeds to Step S107.

That is, the association processing unit 35 determines correspondences between pieces of object data and pieces of prediction data by associating the pieces of object data for the associated time and the pieces of prediction data for the associated time individually with each other.

The association processing unit 35 determines the correspondence between the object data and the prediction data through use of a simple nearest neighbor (SNN) algorithm, a multiple hypothesis tracking (MHT) algorithm, a global nearest neighbor (GNN) algorithm, or a joint probabilistic data association (JPDA) algorithm, for example.

In this manner, the association processing unit 35 associates, for the respective objects, the pieces of object data for the associated time and the pieces of prediction data for the associated time individually with each other.

In Step S107, the update processing unit 36 performs the following update processing for each of the objects through use of the object data and the prediction data having the correspondence determined in Step S106, and then the processing proceeds to Step S108.

That is, the update processing unit 36 updates the track data for the previous associated time through use of the object data and the prediction data that correspond to each other, to thereby generate track data for the current associated time.

The update processing unit 36 updates the track data through use of the least-squares method, the Kalman filter, or a particle filter, for example.

In this manner, the update processing unit 36 generates, for each of the objects, the track data for the associated time through use of the object data and the prediction data that correspond to each other for the associated time.

In Step S108, the data receiving unit 32 marks the unused object data as "used". The processing then returns to Step S103.

In Step S109, the association processing unit 35 classifies the pieces of unused object data into pieces regarded as ready for the association determination and pieces not regarded as ready for the association determination. The processing then proceeds to Step S110.

Here, the following example can be given as a method of regarding the object data as ready for the association determination.

That is, as a first example (1), the association processing unit 35 sets a small gate, which is smaller than a normal gate corresponding to the prediction data, to regard the object data that has entered the small gate as ready for the association determination. Once a piece of object data enters such a small gate, an association result does not change even when the remaining pieces of object data are received later, and hence the piece of object data that has entered the small gate is regarded as ready for the association determination. A size of the small gate is determined from the predicted value of the track data, that is, size information on the object included in the prediction data.

Figure 4A:
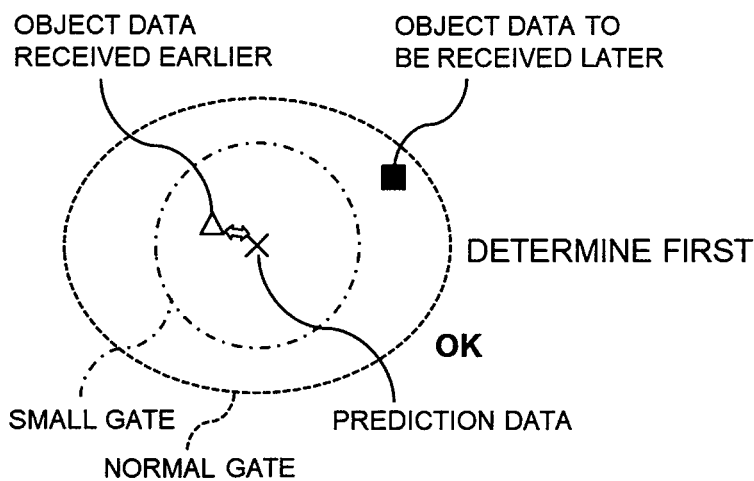
FIG. 4A is an explanatory diagram for illustrating a first pattern of reception of object data and association determination in the first embodiment of the present invention.
Figure 4B:
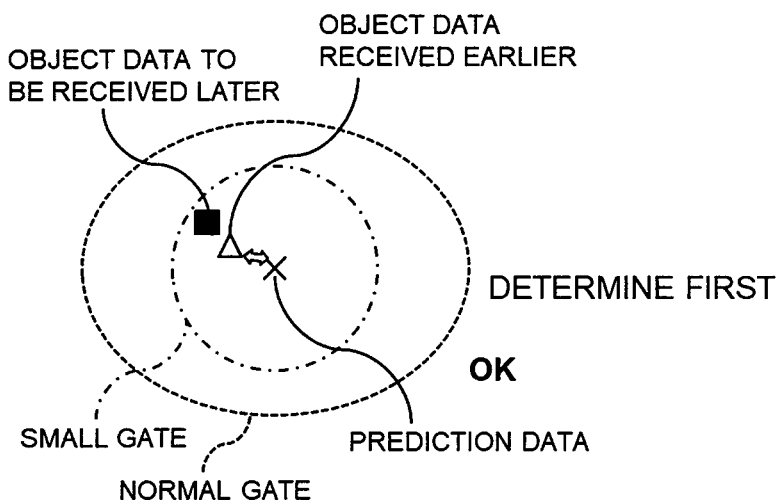
FIG. 4B is a diagram for illustrating a second pattern of the reception of the object data and the association determination in the first embodiment of the present invention.

FIG. 4A to FIG. 4F are explanatory diagrams for illustrating first to sixth patterns of the reception of the object data and the association determination in the first embodiment of the present invention. The pattern illustrated in FIG. 4A is a pattern in which the object data received before the processing time Tk is present inside the small gate, and the object data to be received after the processing time Tk is present outside the small gate. FIG. 4B is a pattern in which both the object data received before the processing time Tk and the object data to be received after the processing time Tk are present inside the small gate, and the object data received earlier is closer to the prediction data.

Figure 4C:
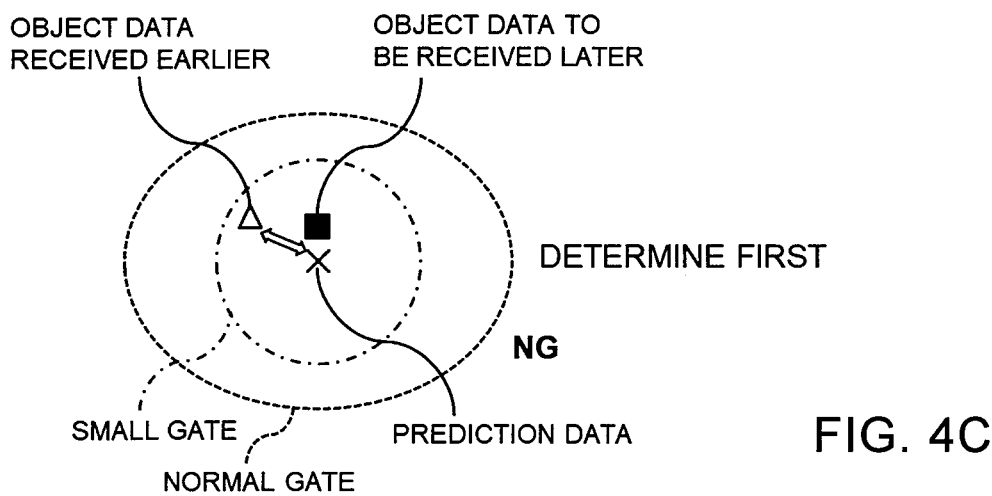
FIG. 4C is a diagram for illustrating a third pattern of the reception of the object data and the association determination in the first embodiment of the present invention.
Figure 4D:
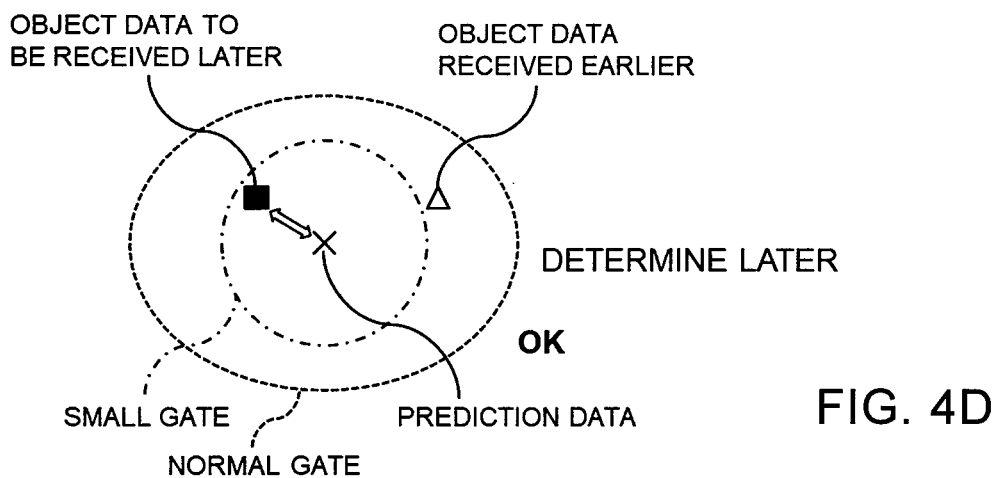
FIG. 4D is a diagram for illustrating a fourth pattern of the reception of the object data and the association determination in the first embodiment of the present invention.

FIG. 4C is a pattern in which both the object data received before the processing time Tk and the object data to be received after the processing time Tk are present inside the small gate, and the object data to be received later is closer to the prediction data. FIG. 4D is a pattern in which the object data received before the processing time Tk is present outside the small gate, and the object data to be received after the processing time Tk is present inside the small gate.

Figure 4E:
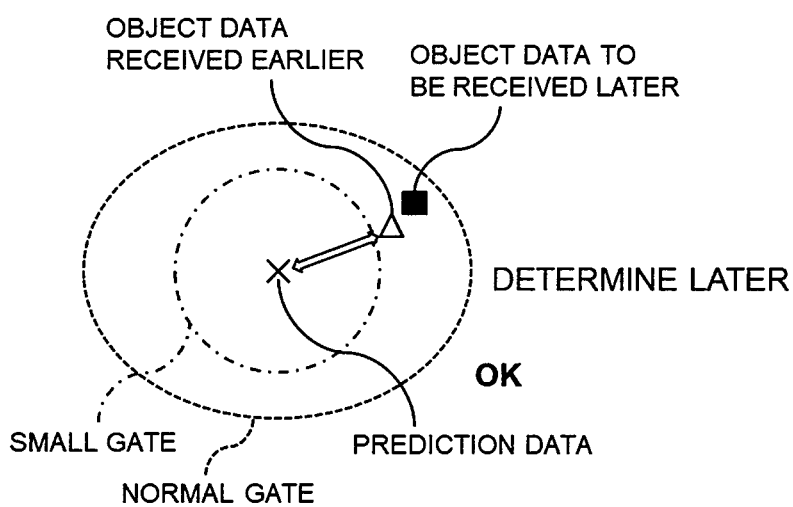
FIG. 4E is a diagram for illustrating a fifth pattern of the reception of the object data and the association determination in the first embodiment of the present invention.
Figure 4F:
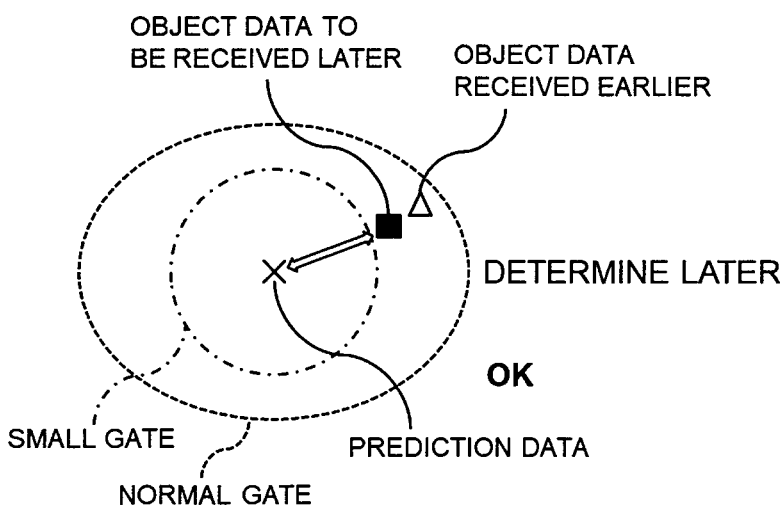
FIG. 4F is a diagram for illustrating a sixth pattern of the reception of the object data and the association determination in the first embodiment of the present invention.

FIG. 4E is a pattern in which both the object data received before the processing time Tk and the object data to be received after the processing time Tk are present outside the small gate, and the object data received earlier is closer to the prediction data. FIG. 4F is a pattern in which both the object data received before the processing time Tk and the object data to be received after the processing time Tk are outside the small gate, and the object data to be received later is closer to the prediction data.

In the patterns illustrated in FIG. 4A to FIG. 4C, an association between the object data received earlier and the prediction data is determined before the reception of the object data to be received later. As a result, in the pattern illustrated in FIG. 4C, the association is incorrect. However, when the small gate is sufficiently small, an influence exerted on the accuracy of the track data can be ignored irrespective of which of the object data received earlier and the object data to be received later is correlated. As required, an incorrect association can be avoided through combination with at least one of a second example (2) to a fifth example (5) described below.

Meanwhile, in the patterns illustrated in FIG. 4D to FIG. 4F, the object data received earlier is not present inside the small gate, and hence after the reception of the object data to be received later is waited for, the association with the prediction data is determined. In this case, the association is not incorrect, but the association determination is suspended until both pieces of object data have been received.

As the second example (2), when an ID or identification included in the prediction data and an ID included in the received object data are the same, the association processing unit 35 regards the received object data as ready for the association determination. For example, the tracking result managed by each sensor is used. In this manner, the association processing unit 35 regards, as ready for the association determination, the object data including the same ID as the ID included in the prediction data.

As the third example (3), when an object type included in the prediction data and an object type included in the received object data are the same, the association processing unit 35 regards the received object data as ready for the association determination. Examples of the object type include a vehicle and a pedestrian. In this manner, the association processing unit 35 regards, as ready for the association determination, the object data including the same type as the type included in the prediction data.

As the fourth example (4), when a high importance degree is exhibited for a post-stage system, for example, when an object is being followed under inter-vehicle distance control, the association processing unit 35 regards the received object data as ready for the association determination. For example, the association processing unit 35 regards, as ready for the association determination, a piece of object data in which a distance from the object corresponding to the prediction data to the own vehicle falls within a set threshold value. In addition, for example, the association processing unit 35 regards, as ready for the association determination, a piece of object data in which a collision prediction time period required until the own vehicle is to collide with the object corresponding to the prediction data falls within a set threshold value. Further, for example, the association processing unit 35 regards, as ready for the association determination, a piece of object data in which a system priority of the vehicle control device installed in the own vehicle is equal to or higher than a set threshold value.

As the fifth example (5), the association processing unit 35 regards the received object data as ready for the association determination based on any one of an identification result, a sensor type, an object data reliability level, an object data detection time period, and the number of times of interpolation. For example, when the identification result is a vehicle, when the sensor type is an optical camera, or when the object data reliability level is equal to or higher than a set threshold value, the association processing unit 35 regards the object data as ready for the association determination.

In this manner, under a state in which not all the pieces of object data in the detection data group G have been received and a part of the pieces of object data have been received by the current processing time Tk, the association processing unit 35 classifies the part of the pieces of object data into pieces regarded as ready for the association determination and pieces not regarded as ready for the association determination.

In Step S110, in the same manner as in Step S106, the following association determination is performed for each of the objects. The processing then proceeds to Step S111.

That is, the association processing unit 35 determines correspondences between pieces of object data and pieces of prediction data by associating the pieces of object data regarded as ready for the association determination and the pieces of prediction data individually with each other.

In this manner, the association processing unit 35 associates the pieces of object data regarded as ready for the association determination and the pieces of prediction data individually with each other. The association processing unit 35 also sets, as pieces of pending object data, the pieces of object data not regarded as ready for the association determination. Under a state in which the remaining pieces of object data in the detection data group G are received by the next processing time after the current processing time Tk, the remaining pieces of object data and the pieces of pending object data are to be associated individually with the pieces of prediction data.

In Step S111, in the same manner as in Step S107, the update processing unit 36 performs the following update processing for each of the objects through use of the object data and the prediction data having the correspondence determined in Step S110. The processing then proceeds to Step S112.

That is, the update processing unit 36 updates the track data for the previous associated time through use of the object data and the prediction data that correspond to each other, to thereby generate track data for the current associated time.

In Step S112, the data receiving unit 32 marks, as "used", the pieces of object data regarded as ready for the association determination in Step S109. The processing then proceeds to Step S113.

In Step S113, the data receiving unit 32 marks, as "pending", the pieces of object data not regarded as ready for the association determination in Step S109. The data storage unit 33 store the pieces of object data marked as "pending". The processing then returns to Step S103. When the data receiving unit 32 receives, after the current processing time Tk, a piece of object data having the same associated time as that of the pieces of pending object data stored in the data storage unit 33, those pieces of pending object data are input to the association processing unit 35.

As described above, according to the first embodiment, the object recognition device is configured to classify, under the state in which not all the pieces of object data in the detection data group have been received and a part of the pieces of object data have been received by a current processing time, the part of the pieces of object data into pieces regarded as ready for the association determination and pieces not regarded as ready for the association determination. The object recognition device is also configured to associate the pieces of object data regarded as ready for the association determination and the pieces of prediction data individually with each other, and set, as pieces of pending object data, the pieces of object data not regarded as ready for the association determination. The object recognition device is further configured to associate, under the state in which the remaining pieces of object data in the detection data group have been received by the next processing time after the current processing time, the remaining pieces of object data and the pieces of pending object data individually with the pieces of prediction data.

With this configuration, track data can be generated in consideration of the relationship between the timing at which all the pieces of object data included in the detection data group formed of a plurality of pieces of object data having the same associated time are received and the timing at which the data processing is started.

Second Embodiment

In a second embodiment of the present invention, the object recognition device 3 having a data processing method different from that of the above-mentioned first embodiment is described. In the second embodiment, description of the same points as those of the above-mentioned first embodiment is omitted, and points different from those of the above-mentioned first embodiment are mainly described.

Figure 5:
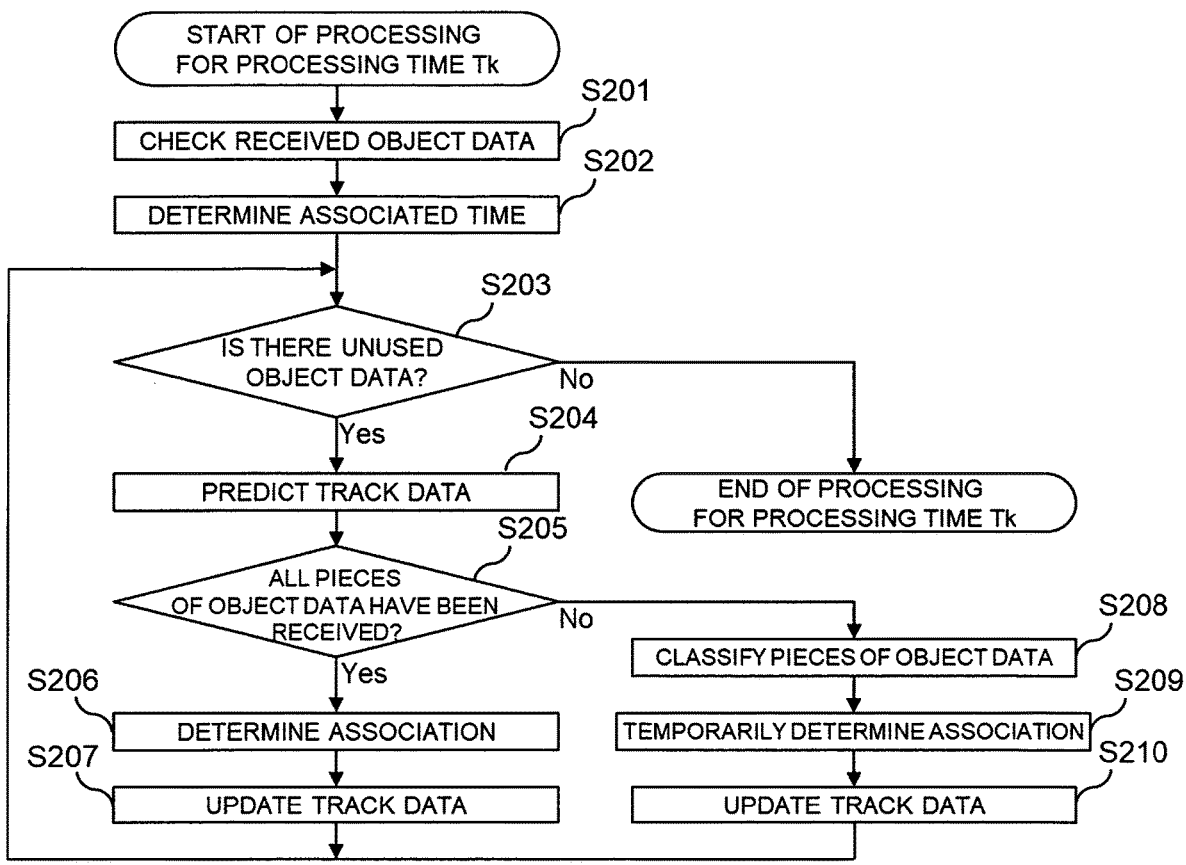
FIG. 5 is a flow chart for illustrating a series of operation steps of data processing to be performed by an object recognition device according to a second embodiment of the present invention.

FIG. 5 is a flow chart for illustrating a series of operation steps of data processing to be performed by the object recognition device 3 according to the second embodiment of the present invention.

In this case, the object recognition device 3 according to the second embodiment performs the same processing as that of the above-mentioned first embodiment when not all the pieces of object data included in the detection data group have been received. However, the association determination is assumed to be temporary. Further, when all the pieces of object data included in the detection data group have been received, the object recognition device 3 newly performs the association determination through use of all the pieces of object data irrespective of the temporarily-determined association. In short, the object recognition device 3 performs redundant processing.

The processing of from Step S201 to Step S205 is the same as the above-mentioned processing of from Step S101 to Step S105 illustrated in FIG. 3.

In Step S206, the association processing unit 35 performs the following association determination for each of the objects, and then the processing proceeds to Step S207.

That is, the association processing unit 35 associates the pieces of object data and the pieces of prediction data individually with each other, to thereby determine the correspondences between the pieces of object data and the pieces of prediction data. When there is no change from the temporarily-determined association, specifically, for example, when not a plurality of pieces of object data have entered the gate of the prediction data, the relevant piece of object data and the track data that correspond to each other are left as temporarily determined, to thereby to be able to reduce the processing load.

The processing of Step S207 is the same as the above-mentioned processing of Step S107 illustrated in FIG. 3.

In Step S208, the association processing unit 35 classifies the pieces of unused object data into pieces regarded as ready for the association determination and pieces not regarded as ready for the association determination. The processing then proceeds to Step S209.

In this manner, under a state in which not all the pieces of object data in the detection data group G have been received and a part of the pieces of object data have been received by the current processing time Tk, the association processing unit 35 classifies the part of the pieces of object data into pieces regarded as ready for the association determination and pieces not regarded as ready for the association determination.

In Step S209, the following temporary association determination is performed for each of the objects, and then the processing proceeds to Step S210.

That is, the association processing unit 35 temporarily determines correspondences between pieces of object data and pieces of prediction data by associating the pieces of object data regarded as ready for the association determination and the pieces of prediction data individually with each other.

In this manner, the association processing unit 35 temporarily associates the pieces of object data regarded as ready for the association determination and the pieces of prediction data individually with each other. In addition, under the state in which the remaining pieces of object data in the detection data group G are received by the next processing time after the current processing time Tk, the association processing unit 35 associates all the pieces of object data in the detection data group and the pieces of prediction data individually with each other.

The processing of Step S210 is the same as the above-mentioned processing of Step S111 illustrated in FIG. 3.

As described above, according to the second embodiment, the object recognition device is configured to classify, under the state in which not all the pieces of object data in the detection data group G have been received and a part of the pieces of object data have been received by a current processing time, the part of the pieces of object data into pieces regarded as ready for the association determination and pieces not regarded as ready for the association determination. The object recognition device is also configured to temporarily associate the pieces of object data regarded as ready for the association determination and the pieces of prediction data individually with each other. The object recognition device is further configured to associate, under the state in which the remaining pieces of object data in the detection data group have been received by the next processing time after the current processing time, all the pieces of object data in the detection data group and the pieces of prediction data individually with each other. Even with such a configuration, the same effects as those of the above-mentioned first embodiment can be produced.

In the embodiments, the plurality of sensors 1 are described as an example, but the present invention is not limited thereto, and the present invention is established even when the number of sensors 1 is one.

REFERENCE SIGNS LIST 1 sensor, 2 vehicle information sensor, 3 object recognition device, 4 information notification device, 5 vehicle control device, 31 time measuring unit, 32 data receiving unit, 33 data storage unit, 34 prediction processing unit, 35 association processing unit, 36 update processing unit.

The invention claimed is:

1. An object recognition device included in a vehicle, wherein the object recognition device is configured to receive, from a sensor of the vehicle, a detection data group formed of a plurality of pieces of object data having the same associated time, to thereby generate pieces of track data on respective objects individually corresponding to the plurality of pieces of object data included in the received detection data group, the object recognition device comprising:
 a data receiver configured to receive the detection data group from the sensor, and associate the associated time with the received detection data group;

a prediction processor configured to generate, for each of the objects, prediction data being a predicted value of each of the pieces of track data for the associated time;
an association processor configured to associate, for the respective objects, the pieces of object data for the associated time and the pieces of prediction data for the associated time individually with each other; and
an update processor configured to generate, for each of the objects, the track data for the associated time through use of the object data and the prediction data that correspond to each other for the associated time,
wherein the association processor is configured to:
classify, under a state in which not all the pieces of object data in the detection data group have been received and a part of the pieces of object data have been received by a current processing time, the part of the pieces of object data into pieces regarded as ready for association determination and pieces not regarded as ready for the association determination, to thereby associate the pieces of object data regarded as ready for the association determination and the pieces of prediction data individually with each other and set, as pieces of pending object data, the pieces of object data not regarded as ready for the association determination; and
associate, under a state in which remaining pieces of object data in the detection data group have been received by the next processing time after the current processing time, the remaining pieces of object data and the pieces of pending object data individually with the pieces of prediction data,
wherein the update processor is further configured to send the track data to a vehicle control device of the vehicle to engage brakes when the track data indicates that a collision between the vehicle and at least one of the objects is unavoidable.

2. The object recognition device according to claim 1, wherein the association processor is configured to set a small gate, which is smaller than a normal gate corresponding to the prediction data, to regard a piece of object data that has entered the small gate as ready for the association determination.

3. The object recognition device according to claim 2, wherein the association processor is configured to set the small gate from size information on an object included in the prediction data.

4. The object recognition device according to claim 1, wherein the association processor is configured to regard the object data including the same ID as an ID included in the prediction data as ready for the association determination.

5. The object recognition device according to claim 1, wherein the association processor is configured to regard the object data including the same type as a type included in the prediction data as ready for the association determination.

6. The object recognition device according to claim 1, wherein the association processor is configured to regard, as ready for the association determination: a piece of object data in which a distance from an object corresponding to the prediction data to an own vehicle falls within a set threshold value; a piece of object data in which a collision prediction time period required until the own vehicle is to collide with the object corresponding to the prediction data falls within a set threshold value; or a piece of object data in which a system priority of a vehicle control device installed in the own vehicle is equal to or higher than a set threshold value.

7. The object recognition device according to claim 1, wherein the association processor is configured to regard the object data as ready for the association determination based on any one of an object type identification result, a sensor type, an object data reliability level, an object data detection time period, and a number of times of interpolation.

8. An object recognition device included in a vehicle, wherein the object recognition device is configured to receive, from a sensor of the vehicle, a detection data group formed of a plurality of pieces of object data having the same associated time, to thereby generate pieces of track data on respective objects individually corresponding to the plurality of pieces of object data included in the received detection data group, the object recognition device comprising:
a data receiver configured to receive the detection data group from the sensor, and associate the associated time with the received detection data group;
a prediction processor configured to generate, for each of the objects, prediction data being a predicted value of each of the pieces of track data for the associated time;
an association processor configured to associate, for the respective objects, the pieces of object data for the associated time and the pieces of prediction data for the associated time individually with each other; and
an update processor configured to generate, for each of the objects, the track data for the associated time through use of the object data and the prediction data that correspond to each other for the associated time,
wherein the association processor is configured to:
classify, under a state in which not all the pieces of object data in the detection data group have been received and a part of the pieces of object data have been received by a current processing time, the part of the pieces of object data into pieces regarded as ready for association determination and pieces not regarded as ready for the association determination, to thereby temporarily associate the pieces of object data regarded as ready for the association determination and the pieces of prediction data individually with each other; and
associate, under a state in which remaining pieces of object data in the detection data group have been received by the next processing time after the current processing time, all the pieces of object data in the detection data group and the pieces of prediction data individually with each other,
wherein the update processor is further configured to send the track data to a vehicle control device of the vehicle to engage brakes when the track data indicates that a collision between the vehicle and at least one of the objects is unavoidable.

9. An object recognition method that is performed by a vehicle for receiving, from a sensor of the vehicle, a detection data group formed of a plurality of pieces of object data having the same associated time, to thereby generate pieces of track data on respective objects individually corresponding to the plurality of pieces of object data included in the received detection data group, the object recognition method comprising the steps of:
receiving the detection data group from the sensor, and associating the associated time with the received detection data group;
generating, for each of the objects, prediction data being a predicted value of each of the pieces of track data for the associated time;

associating, for the respective objects, the pieces of object data for the associated time and the pieces of prediction data for the associated time individually with each other;

generating, for each of the objects, the track data for the associated time through use of the object data and the prediction data that correspond to each other for the associated time; and sending the track data to a vehicle control device of the vehicle to engage brakes when the track data indicates that a collision between the vehicle and at least one of the objects is unavoidable, wherein the step of associating includes:

classifying, under a state in which not all the pieces of object data in the detection data group have been received and a part of the pieces of object data have been received by a current processing time, the part of the pieces of object data into pieces regarded as ready for association determination and pieces not regarded as ready for the association determination, to thereby associate the pieces of object data regarded as ready for the association determination and the pieces of prediction data individually with each other and set, as pieces of pending object data, the pieces of object data not regarded as ready for the association determination; and associating, under a state in which remaining pieces of object data in the detection data group have been received by the next processing time after the current processing time, the remaining pieces of object data and the pieces of pending object data individually with the pieces of prediction data.

10. An object recognition method that is performed by a vehicle for receiving, from a sensor of the vehicle, a detection data group formed of a plurality of pieces of object data having the same associated time, to thereby generate pieces of track data on respective objects individually corresponding to the plurality of pieces of object data included in the received detection data group, the object recognition method comprising the steps of:

receiving the detection data group from the sensor, and associate the associated time with the received detection data group;

generating, for each of the objects, prediction data being a predicted value of each of the pieces of track data for the associated time;

associating, for the respective objects, the pieces of object data for the associated time and the pieces of prediction data for the associated time individually with each other;

generating, for each of the objects, the track data for the associated time through use of the object data and the prediction data that correspond to each other for the associated time; and sending the track data to a vehicle control device of the vehicle to engage brakes when the track data indicates that a collision between the vehicle and at least one of the objects is unavoidable, wherein the step of associating includes:

classifying, under a state in which not all the pieces of object data in the detection data group have been received and a part of the pieces of object data have been received by a current processing time, the part of the pieces of object data into pieces regarded as ready for association determination and pieces not regarded as ready for the association determination, to thereby temporarily associate the pieces of object data regarded as ready for the association determination and the pieces of prediction data individually with each other; and associating, under a state in which remaining pieces of object data in the detection data group have been received by the next processing time after the current processing time, all the pieces of object data in the detection data group individually with the pieces of prediction data.

* * * * *